United States Patent [19]

Munday

[11] 4,055,117
[45] Oct. 25, 1977

[54] PRINTING METHODS AND APPARATUS

[75] Inventor: Basil Sidney Munday, Harpenden, England

[73] Assignee: International Computers Limited, London, England

[21] Appl. No.: 697,244

[22] Filed: June 17, 1976

[30] Foreign Application Priority Data

July 2, 1975 United Kingdom ............... 27876/75

[51] Int. Cl.² ............................................. B41J 1/20
[52] U.S. Cl. ................................. 101/93.14; 101/111; 101/93.01; 101/93.09
[58] Field of Search ...................... 101/111, 110, 93.13, 101/93.14, 93.01, 93.09, 93.23; 197/17, 18, 53-55

[56] References Cited

U.S. PATENT DOCUMENTS

| | | | |
|---|---|---|---|
| 3,247,788 | 4/1966 | Wilkins et al. ...................... | 101/93.09 |
| 3,289,576 | 12/1966 | Bloom et al. ........................ | 101/93.14 |
| 3,629,861 | 12/1971 | Marsh et al. ........................ | 101/93.14 |
| 3,630,335 | 12/1971 | Chamness ........................... | 101/93.09 |
| 3,672,297 | 6/1972 | Berglund et al. ................... | 101/93.09 |
| 3,880,075 | 4/1975 | Bovett et al. .................. | 101/93.14 X |
| 3,952,648 | 4/1976 | Sery et al. .......................... | 101/93.14 |

*Primary Examiner*—Edward M. Coven
*Attorney, Agent, or Firm*—Hane, Roberts, Spiecens & Cohen

[57] ABSTRACT

In printing apparatus in which a line of characters is printed on a record medium, by means of differentially timed operation of a line of print hammers, as the characters pass predetermined columnar positions of the record medium, the character font size can be changed. On each change of front size, a control circuit adjusts the timing of the actuation of the hammers so that the number of printing cycles necessary to print a line of characters is varied according to the font size used.

5 Claims, 3 Drawing Figures

PRINTING METHODS AND APPARATUS

BACKGROUND OF THE INVENTION

1. Field of the Invention

The present invention relates to printing methods and apparatus and in particular to methods of and apparatus for printing a line of characters on a record by the differentially timed operation of a line of print hammers as the characters of a font pass predetermined columnar positions of the record.

2. Description of the Prior Art

Printing apparatus is well known in which, for example, a line of type-wheels is rotated while supported adjacent a record medium such as a paper web, a transfer medium, such as a inked ribbon being interposed between the web and the type-wheels. Behind the record medium a line of print hammers, one for each wheel, is arranged parallel to the line of the wheels. Thus, in order to print a line of characters, each print hammer is actuated as the required character on its associated print wheel arrives at the print line position on the record medium. Actuation of a hammer causes the record medium to be brought against the transfer medium which in turn is brought against the corresponding print wheel, thereby causing an impression of the character at the printing position to be recorded on the web. It will be seen that the number of characters or columnar positions in a line is set by the number of type-wheels and also that a separate hammer is required for each wheel. Hence, a printing apparatus of this kind is limited to the printing of, effectively, one size of type only and, in consequence, to a prescribed columnar pitch for the print lines.

It has also been proposed to use, instead of a line of type-wheels, a belt or chain carrying the type font, the chain moving along a track which is parallel to the line of hammers. Because the character movement is along the line to be printed, it will be seen that a very limited variation in columnar position of printer characters appears to be possible. However, in practice the variation permissible is insufficient to permit an appreciable variation in the number of characters which may be recorded in a line of given length.

As the cost of material for record purposes has risen, it has become more important to be able to reduce the costs of printing multiple copies of records. It has become well worth-while, for example, to produce purely record copies of documents on a reduced scale as compared with working copies, and it will be realised that a printing apparatus which can provide a printed output in one or other of, say, two different fonts is highly desirable.

SUMMARY OF THE INVENTION

Printing apparatus is proposed in which type fonts are interchangeable, the interchangeable fonts having characters of different sizes respectively. A font of type is carried on a member which is supported in a type carrier and the type carrier is engaged with a drive so arranged that the member carrying the type is supported adjacent a line of hammers arranged parallel to the print line on a record. The selective timed actuation of the hammers prints characters in the line and when the type size of the font in use corresponds to the hammer pitch spacing all the characters of the line are printed in a single printing cycle. If, however, the character size requires the spacing of characters in the line to be less than the pitch spacing of the hammers, a line of characters is printed in at least two cycles and a relative lateral shift between the record and the hammers in the direction of the print line is produced between successive cycles, the extent of the displacement being equal to the required pitch spacing of the characters in the line.

Also contemplated is a method of printing which requires the provision of interchangeable type fonts of different sizes respectively in a line printer which operates by the timed cyclic selective actuation of hammers arranged in a line aligned with the printing line on the record. The method distinguishes between the operations to be performed in dependence on the respective sizes of the fonts in relation to the hammer pitch spacing and modifies the control of hammer actuation such that the cyclic selection is combined with a relative lateral shift between hammers and record in those cases where the font size requires characters to be printed at a pitch spacing less than the pitch spacing of the hammers, the shifting alternating with printing over a succession of printing cycles. The extent of the shift is made equal to the required pitch spacing of the characters in the line to be printed and a predetermined proportion of the characters is printed on each cycle.

BRIEF DESCRIPTION OF THE DRAWINGS

Apparatus embodying the present invention will now be described, by way of example, with reference to the accompanying drawing, in which.

DESCRIPTION OF THE PREFERRED EMBODIMENT

Figure 1:
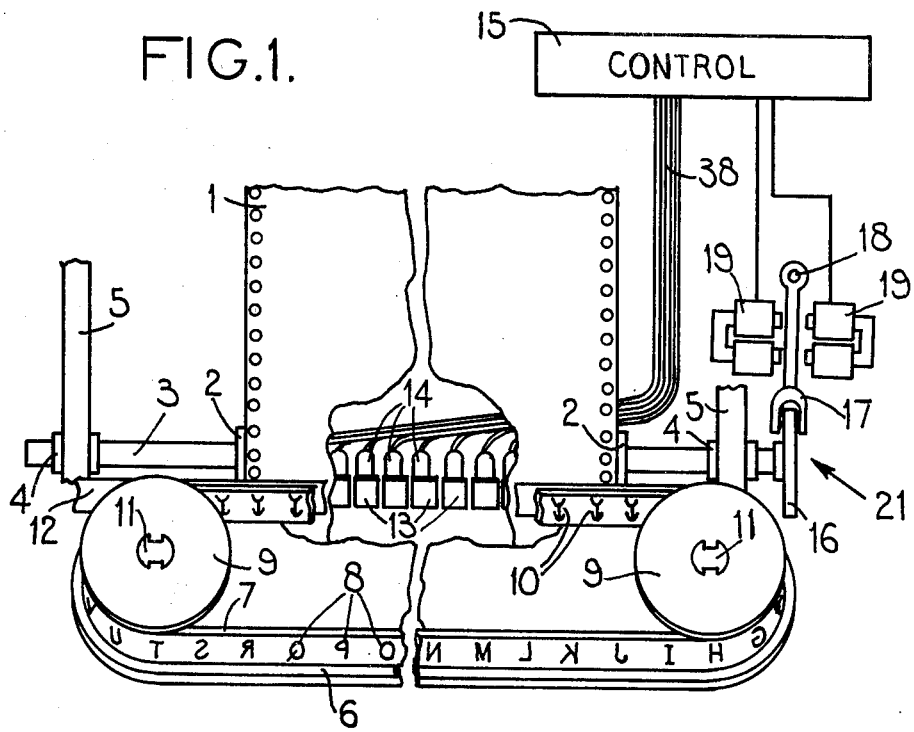
FIG. 1 shows diagrammatically a printing apparatus employing a band of type.

Referring now to FIG. 1 of the drawing, a simplified schematic illustration of a printing apparatus is shown. A paper web 1 provides a record and is transported through the apparatus by a conventional paper-feeding tractor arrangement 2 carried on a shaft 3 supported in bearings 4 in sideframes 5 of the apparatus. An interchangeable type cassette is provided adjacent the paper web and is represented by a tray 6 carrying a band or chain 7 of type elements 8. The band 7 is driven by a pair of drive pulleys 9, one at each end of the tray 6 and to ensure that the proper timing of movement of the type elements 8 along a printing line on the web 1 is preserved, the band 7 is provided with projections 10 which engage with corresponding recesses (not shown) in the pulleys 9. The pulleys 9 are driven by spindles 11 projecting from the printer drive mechanism (not shown) and which are engaged with the pulleys 9 when the cassette 6 is mounted on the apparatus.

An inked ribbon 12, which acts as a transfer medium, is provided between the band 7 and the paper web 1. On the opposite side of the web to the band is a line of print hammers 13 which are driven by electrically operated actuators 14, one for each hammer. The operation of the hammers is controlled by a control arrangement 15.

Arrangements for controlling printers of the general kind described above are well known in the art and one such band printer is described in detail, together with its control arrangement, in British Patent Specification No.

858,410, to which reference may be made for further information. However, it may be explained very briefly that the characters required to print a line are stored in the control arrangement. Two timing devices are employed. One is synchronised to the passage of character on the band along the line to be printed, while the other keeps track of the identity of characters entering the printing line. A store containing characters to be printed is scanned out as the characters on the band pass along the line and a comparator is used to determine when a required character is presented at the line, the requisite hammer being actuated at a time which is modified according to the position of the hammer in line, so that the actual hammer blow takes place at that instant of time when the required character is at a predetermined position in relation to the required columnar position in the line.

In order to accommodate the arrangement of the present invention namely the interchangeability of the type element fonts the shaft 3 is arranged for longitudinal movement to shift the tractor 2 and hence the paper web 1 in a direction parallel to the row of hammers 13. This movement is controlled by a flange 16 on the shaft which lies within a forked end of an armature 17 pivoted at its other end on a pin 18. The armature is moved about the pivot pin 18 by means of electromagnetic actuators 19 to move the shaft 3 by a controlled distance. Electrical signals for operating the actuators 19 and also for energising the print hammer actuators 14 are obtained from the general control arrangements for the cyclic operation of the printing machine.

Figure 2:
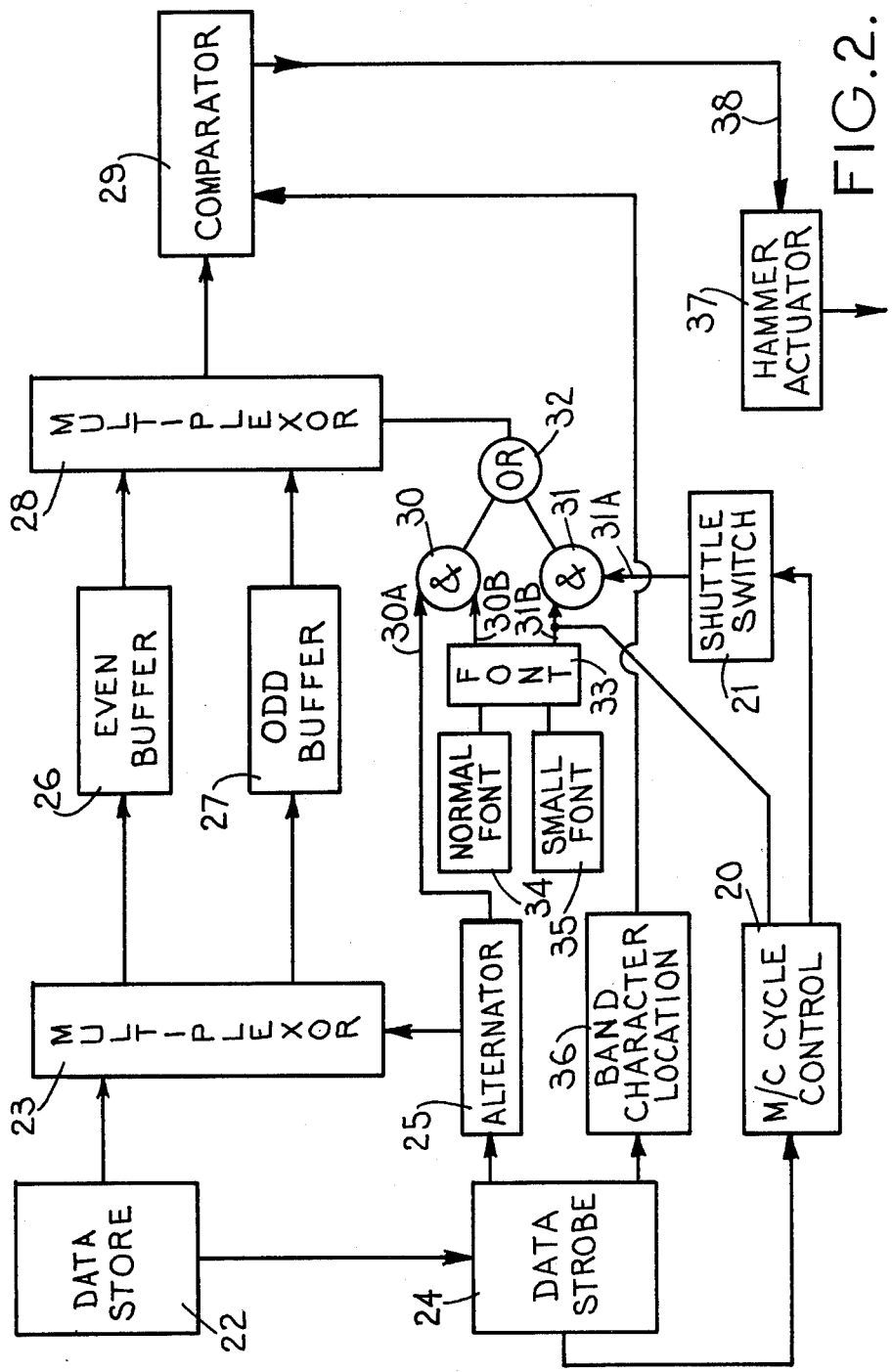
FIG. 2 is a block diagram of a construction of a control circuit and used in control to the operation of the apparatus of FIG. 1

The control arrangement is schematically represented in the block diagram of FIG. 2. The block diagram also includes components which are not merely provided for the implementation of the font size change facility of the invention but which are provided as part of the facilities of a printer.

Referring now to FIG. 2, the general control arrangement for obtaining the cyclic operation of the printer to which the invention is applied is schematically represented by the block 20, which has been labelled M/C cycle control. It will be understood that the cycle control 20 is arranged to produce signals which interrelate the drive of the band, the energisation of the hammers, and the actuation of the electromagnetic actuation arrangements 17, 18, 19. For convenience, in FIG. 2 these last mentioned elements have been collectively identified as a shuttle switch 21.

Data to be printed is fed from for example a computer control processor unit (not shown) to a data store 22 which stores code signals characteristic of characters to be printed, and which incorporates timing signals.

The output from the store 22 is applied to a multiplexer 23 and to a data strobe circuit 24 which latter derives from the input applied thereto timing signals which are utilised to synchronise the data processing aspect of the circuit of FIG. 2, with the machine cycle control 20.

The multiplexor 23 is arranged to switch, under the control of an alternator 25 whose operation is controlled by the data strobe 24, the data received from the store 22 between a first buffer store 26, and a second buffer store 27.

The outputs of the buffer stores 26 and 27 are routed by way of a second multiplexor 28 to a comparator circuit 29.

The operation of the multiplexor 28 is controlled by a logic gate arrangement including AND gates 30, 31, and OR gate 32.

The gate 30 has two inputs 30A, 30B. The input 30A is connected to receive output from the alternator 25, and the other input 30B a signal indicative that the font being used is the large size — or normal size font.

This signal is produced by way of a font switch 33 which is closed when the normal font (schematically indicated by a block 34 FIG. 2) is being used.

The second AND gate 31 has two inputs 31A, 31B. The input 31A is connected to receive a signal related to the setting of the shuttle switch 21, and the input 31B a signal which is produced by way of the switch 33 when the small font (schematically indicated by a block 35 in FIG. 3) is being used.

The comparator circuit 29 compares each data character received from the multiplexor 28 with a signal which is characteristic of the characters which are in such position relative to the hammers as to be ready for printing. This latter signal is obtained from a band character location detector circuit 36, whose operation is synchronised with the remainder of the circuitry of FIG. 2 by timing control signals obtained from the data strobe 24.

The output from the comparator is used to energise the hammer actuator circuits 37 by way of a control highway 38.

The above described circuit involves the following operational conditions. Data from the data store 22 is routed by the multiplexor 23 alternately to the first buffer 26 and the second buffer 27 under the control of the alternator 25. The switching of the multiplexor is synchronised with the data feed by reason of the timing signals derived by the data strobe 24. For convenience, the first buffer 26 can be regarded as being concerned with even numbered hammers of the line of hammers 13, and the second buffer 27 can be regarded as being concerned with odd numbered hammers. The outputs from the buffers are applied to the comparator 24 under the control of the multiplexor 28. The multiplexor 28 is switched by one or the other of two switch signals, one of which is produced when the larger font band is being used, and the other of which is produced when the smaller font is being used. (This will be discussed in greater detail hereinafter) In the comparator 29 the output from the multiplexor 28 is compared with a control signal (from the unit 36) which signal effectively identifies that character on the font band 7 which is correctly positioned for printing purposes. The output of the comparator is used to energise the hammer actuator means 37.

Figure 3:
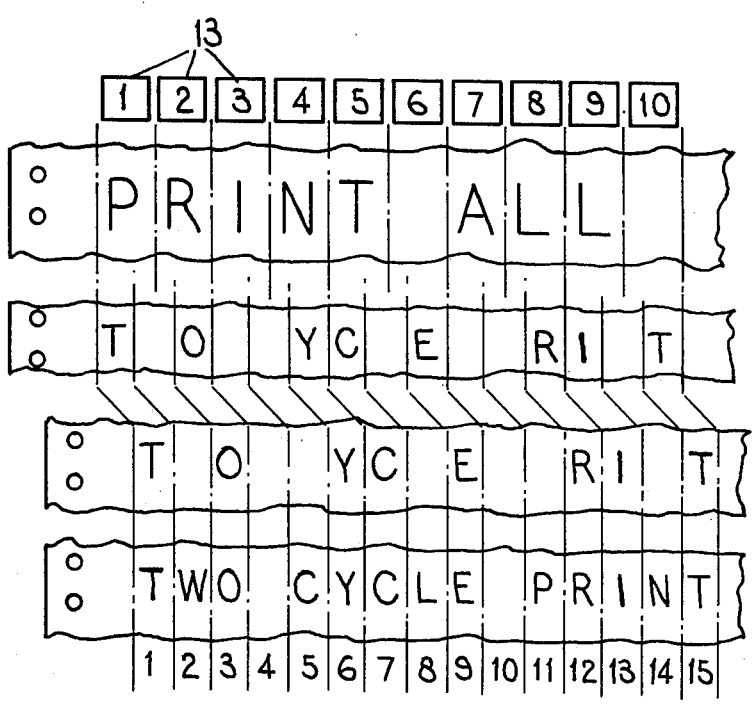
FIG. 3 illustrates printing of parts of lines of characters in two differently-sized fonts respectively.

The manner in which the above described control arrangement 15 is arranged to be able to operate in alternative modes which will be considered separately in conjunction with FIGS. 2 and 3 of the drawings. In the first mode to be considered, the type cassette 6 (FIG. 1) provided on the machine has a band 7 carrying type characters of a size such that their line spacing on the the record is required to be equal to the pitch of the hammers 13. This can be regarded as the basic or normal mode. Because the spacing of characters in the line under these conditions is constant, it will be seen that the characters printed in a succession of lines on the record actually fall into vertical columns and, for clarity, the positions in a printed line in which characters may be printed will be referred to as columnar positions or columns on the record.

When the normal size font cassette 6 is being used the switch 33 (FIG. 2) is set to connect the input 30B of the AND gate 30 to receive an enabling input, and to cut-off the input 31B of the AND gate 31 from receiving an enabling input.

Since, during the operation with normal size font the actuator 25 not only applies control signals to the multiplexor 28, but also applies a succession of signals to the input 30A of the AND gate 30, the latter will be able to produce a series of output pulses which are fed to the multiplexor 28 through the OR gate 32. Consequently, the multiplexor 28 is switched in step with the multiplexor 23, whereby the data is fed from the buffers 26, 27 in the order in which it is applied to the buffers from the data stores. It will be understood that the data will be routed alternately to the buffers.

Referring now to FIG. 3, a group of ten hammers 13 is illustrated at $a$ on an enlarged scale, as they would be arranged in the apparatus, with a small clearance between adjacent hammers. As noted above, the pitch of the hammers 13 corresponds to the spacing of the column positions on the record as indicated in the Figure at $a$ and $b$. It will be seen that after a single printing cycle in which all the characters required for printing have passed the columnar positions of the line on the record, printing of the words "PRINT ALL" is accomplished, the hammer 13 — 1 corresponds to the first column position in the line and is actuated as the character "P" has moved to the centre of the first columnar position. The remaining hammers 13, except for hammers 13-6 and -10, are actuated to print their selected characters centrally in the corresponding columnar positions. The hammers 13-6 and 13-10 correspond to columns associated with inter-word spaces and are not actuated at all.

For the second mode of operation, the cassette 6 (FIG. 1) containing the type font is exchanged for one whose band 7 carries smaller type characters than that described above. The change over of the font to the small size font causes the switch 33 (FIG. 2) to move to its alternative position so that (a) the enabling signal is removed from input 30B to render AND gate 30 inoperative thereby cutting-off the alternator 25 from switching the multiplexor 28 and (b) an enabling signal is applied to the gate 31B of the AND gate 31.

In addition, the movement of the switch 33 to the small font setting also operates control means in the machine cycle control which enables the shuttle switch arrangement so that at the completion of each operational cycle of the band the shuttle switch is actuated thereby causing operation of the means 21 to displace the paper as described above. In other words at the end of each print cycle the shuttle is operated and in so doing displaces the paper web and also produces a signal to switch the multiplexor 28 via OR gate 32. That is to say the multiplexor 28 is switched in step with the paper displacement. In the example to be described it will be assumed that the size of characters is such that the columnar positions on the record are required to be two-thirds the pitch spacing of the hammers 13 (FIGS. 1 and 3). Thus, as is indicated at $c$ to $e$ of FIG. 3, two hammers 13 now span three columnar positions on the record. In order to print a line of characters, the line is broken up into two partial lines, one containing two-thirds of the required characters and omitting the second and then every third character, i.e. the second, fifth, eighth, eleventh, fourteenth, and so on. The second partial line contains the omitted letters. In practice, in this case, the first partial line characters are applied to the even buffer 26 (FIG. 2) and the second partial line characters are directed to the odd buffer 27.

Thus in this second mode, in order to print the line, the first partial line of characters is treated as a full line applied to the hammers and the control arrangement switches the hammer strobe timing so that odd-numbered hammers are actuated at time instants when their respective characters are centralised within the left-hand (as illustrated at $c$ of FIG. 3) two-thirds of the hammer-width and even numbered hammers are actuated when their respective characters are centralised within the right-hand two-thirds of the hammer width. This control is effected by the machine cycle control circuit 20 (FIG. 1). The completion of a print cycle during which this partial line is printed is illustrated at $c$ of FIG. 3, from which it will be seen that, in the example chosen, hammers 13-3 and 13-7 correspond to spaces and do not print on this print cycle.

At the conclusion of this first print cycle the control arrangement 15 (FIG. 2) energises the electro magnets 19 (FIGS. 1 and 2) to shift the web 1 towards the right relative to the hammers by one columnar position as illustrated at $d$ of FIG. 3.

Another print cycle then takes place during which the remaining characters of the line are distributed over the even numbered hammers only, the timing of the hammer actuation being arranged as in the first cycle to print the respective characters as they are centralised within the right-hand two-thirds of the hammer width. The result of this second cycle is illustrated at $e$ of FIG. 3. To simplify the distribution of characters during the second cycle, the second partial line may be regarded as alternatively "character-space-character-space..." and so on, the distribution of the partial lines then being accomplished in both cycles in the same way. This timing is probably best arranged by arranging for the data strobe 24 (FIG. 2) and the control 20 to provide three hammer strobe signals arranged to print a character respectively in the "centre of hammer face" position, in the "centre of first two-thirds of hammer face" and in the "centre of last two-thirds of hammer face". The changing of a type font cassette from one character size to the other then requires, for all the hammers, causing the switching between the centre of hammer face signal and one of the other strobe signals.

The switching of the timing signals and the switching of operation from single to multiple cycle during change over of the type font cassettes 6 (FIG. 1), is a comparatively simple operation to achieve. For example interlocks on the cassette 6 itself can ensure that appropriate switching is accomplished automatically. Such arrangements, for example, could include lugs on the cassette co-operating with suitably-wired contacts mounted, for example, on the frame of the apparatus.

It will also be apparent that with the arrangement described, the printing capacity of the apparatus will depend upon the particular cassette which is provided at any time. By way of example, the case will be considered of a nominal ten-character-per-inch arrangement in which the columnar positions on the record when operation in the first-mentioned mode are 0.1 inches (2.5mm) wide. In this case the hammer pitch would also be 0.1 inches (2.5mm), the face of the hammers 13 being approximately 0.09 (2.25mm) wide. The cassette used for second mode operation would provide type characters approximately two-thirds the nominal size. Hence the cassette would print approximately fifteen characters per inch (25.4mm) in a line, each character being centralised with respect to a column 0.066 inches (1.6mm) wide. The pitch of the type elements 8 on the band is rather greater and is about 0.106 inches (2.7mm), in order to avoid partial printing of adjacent characters by the wide hammers 13.

Providing these cassettes in conjunction with a printing apparatus having 88 hammers 13 and actuators 14 and in which the paper shift obtained is 0.066 inches (1.6mm) results in the apparatus capable of printing, in first mode, a line of 88 columns or characters in a single cycle or, in second mode, a line of 132 columns or characters in 2 cycles. Hence the printing speed of the apparatus in second mode is approximately halved by virtue of the need for twice as many cycles.

While an arrangement such as that described in the preceding paragraph is adequate for many purposes, it is possible to envisage an arrangement which will require the same printing capacity in each mode and such an arrangement could have a central block of, say 88 hammers at a standard pitch of 0.1 inch (2.5mm). Extensions to this block of hammers would then be provided at each end, both extensions containing 11 hammers at twice the standard pitch, namely 0.2 inches (5.0mm) this new pitch being measured from and including the odd-numbered hammers of the central block. Thus the hammers include one group of 66 at the double pitch from end to end of the hammer line and a second group actually containing 88 hammers at single pitch in the centre of the line.

The apparatus is also provided with means for relatively shifting the paper by either 0.1 inches (2.5mm) or by 0.066 inches (1.6mm). Thus, a line of the smaller characters is printed in the second mode outlined above using the central block of 88 hammers to provide 132 columnar positions in the line and requiring 2 print cycles. A line of the larger characters may be printed, using the alternative cassette, by using the group of 66 hammers spaced at double pitch, in two print cycles with a relative paper shift equal to a single pitch distance of 0.1 inches (2.5mm) to yield a line also having 132 columnar positions. Thus, this arrangement enables the production of large working copies or smaller record copies of documents as required at the same effective printing speed. It will also be realised that the central block of 89 hammers could also be used to produce a printed output having lines of up to 89 of the larger characters, each line being printed in a single printing cycle.

Although the examples given above require only the provision of a font of smaller type having characters two-thirds the size of those of the larger type, it will be realised that the method of printing described is not limited to fonts of type having this relationship. What is required is that the record should be moved relative to the hammers so that smaller characters may be printed in more printing positions along the line than there are hammers; that each hammer can select only one character or type element at a time when it is aligned with that print position in which it is to be recorded; and that sufficient printing cycles are used (a) to ensure that characters can, if required, be recorded in all columnar positions on the line, and (b) that the hammer actuation arrangements have sufficient time to restore in readiness, if necessary, to print another character. Cycle control circuits and devices are well known in the printer art as are arrangements for selecting and timing type elements to enable characters to be printed.

I claim:

1. Apparatus for printing on a record a line of characters from one of a plurality of interchangeable fonts of type, each font consisting of characters of the same size, different fonts having characters of different sizes respectively, the required pitch spacing of characters in a line being dependent upon the particular font from which the characters are selected, the apparatus including means for supporting the record; a plurality of print hammers arranged adjacent the record in a line parallel to the line in which the characters are required to be printed and being spaced apart at constant pitch, driving means engageable with a type carrier having a member carrying the characters of a single font to drive that member to move the characters in sequence past each of the hammers during a printing cycle; selectively operable shifting means for producing a lateral displacement between the record and the hammers in the direction of the printing line; switch means settable in accordance with the size of the characters of the engaged type carrier and control means effective to select the hammers to be operated at those time instants when characters are respectively in their required positions in the line during the cycle, the control means being further arranged in response to the setting of the switch means to operate the hammers to print all the characters of a line in a single cycle if the characters are of a first size requiring the spacing of the characters in the line to correspond to the pitch spacing of the hammers, to operate the hammers to print the line of characters in at least two cycles if the characters are of a second size requiring the spacing of characters in the line to be less than the pitch spacing of the hammers and to operate the shifting means to produce a lateral displacement equal to the required pitch spacing of characters in the line between successive ones of those printing cycles required to complete the printing of the line.

2. Apparatus as claimed in claim 1 wherein the control means includes a buffer storage arrangement; means for feeding data representing characters to be printed into the buffer storage arrangement and means for reading said data out of the buffer storage arrangement responsive to the switch means and to the shifting means to select representations of those characters to be printed in a printing cycle.

3. Apparatus as claimed in claim 1 in which the control means includes means for selecting hammers to be operated, the buffer storage arrangement includes first and second buffer stores, the feeding means includes a first data distribution means for distributing character data into the first and second buffer stores and the reading means includes a second distribution means for reading character data to the hammer selecting means from the first and second buffer stores, the first and second data distribution means being conditioned if the switch means is set in response to the engagement of a carrier having characters of the first size to feed character representations alternately to the first and second buffer stores and to read out representations from the buffer stores alternately effectively to read out all the character representations in the order in which they are fed in a single printing cycle and if the switch means is set in response to the engagement of a carrier having characters of the second size to modify the conditioning of the first distribution means to feed the character representations required for different print cycles respectively to different buffer stores and to modify the conditioning of the second distribution means to respond to the shifting means to read out the representations from the first and second buffer stores in succession.

4. Apparatus as claimed in claim 3 in which the first and second distribution means are respectively first and second multiplexors.

5. A method of printing lines of characters on a record includes the steps of providing a printing apparatus with interchangeable type fonts having characters of different sizes respectively; with a line of hammers of predetermined constant pitch arranged parallel to the record and aligned with a line to be printed and with means for recognizing the size of characters in a font in use; moving all the characters of the font in use respectively past the hammers during each of a succession of print cycles and actuating the hammers selectively to cause characters to be printed in the line, the method further including, if the character size of the font in use is recognized as requiring the characters to be printed at a spacing corresponding to the hammer pitch, printing all the characters of the line in a single print cycle and if the character size of font in use is recognized as requiring the characters to be printed at a spacing which is a fractional part of the hammer pitch, printing the characters of the line in more than one successive print cycles and producing relative movement in a direction parallel to the line between the record and the hammers between the successive print cycles, the extent of the relative movement corresponding to that fraction of the hammer pitch required for the character spacing.

* * * * *